`US011081891B2`

(12) United States Patent
Wagoner et al.

(10) Patent No.: US 11,081,891 B2
(45) Date of Patent: Aug. 3, 2021

(54) ELECTRICAL POWER SYSTEMS HAVING REACTIVE POWER AND HARMONIC SUPPORT COMPONENTS

(71) Applicant: General Electric Company, Schenectady, NY (US)

(72) Inventors: Robert Gregory Wagoner, Roanoke, VA (US); Harold Robert Schnetzka, Simpsonville, SC (US); John Leo Bollenbecker, Albany, NY (US); Govardhan Ganireddy, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 302 days.

(21) Appl. No.: 15/587,437

(22) Filed: May 5, 2017

(65) Prior Publication Data
US 2018/0323618 A1 Nov. 8, 2018

(51) Int. Cl.
*H02J 3/38* (2006.01)
*H02M 5/458* (2006.01)
(Continued)

(52) U.S. Cl.
CPC ............... *H02J 3/386* (2013.01); *H02J 3/01* (2013.01); *H02J 3/18* (2013.01); *H02J 3/1842* (2013.01);
(Continued)

(58) Field of Classification Search
CPC .... H02J 3/386; H02J 3/01; H02J 3/18; H02M 5/458
See application file for complete search history.

(56) References Cited

U.S. PATENT DOCUMENTS

| 3,593,106 A | 7/1971 | Lafuze |
| 4,281,371 A | 7/1981 | Baker |
| (Continued) | | |

FOREIGN PATENT DOCUMENTS

| CN | 105356520 A | 2/2016 |
| EP | 1276219 A1 | 1/2003 |
| (Continued) | | |

OTHER PUBLICATIONS

International Search Report and Written Opinion issued in connection with corresponding PCT Application No. PCT/US2018/030581 dated Aug. 16, 2018.
(Continued)

*Primary Examiner* — Rexford N Barnie
*Assistant Examiner* — Elim Ortiz
(74) *Attorney, Agent, or Firm* — Dority & Manning, P.A.

(57) ABSTRACT

An electrical power system connectable to a power grid includes a cluster of electrical power subsystems, each of the electrical power subsystems including a power converter electrically coupled to a generator having a generator rotor and a generator stator. Each of the electrical power subsystems defines a stator power path and a converter power path for providing power to the power grid. Each of the electrical power subsystems further includes a transformer. The system further includes a subsystem breaker configured with each of the electrical power subsystems, and a cluster power path extending from each subsystem breaker for connecting the cluster of electrical power subsystems to the power grid. The system further includes a reactive power compensation inverter electrically coupled within the electrical power system, the reactive power compensation inverter operable to increase the reactive power level in the electrical current flowing to the power grid.

18 Claims, 9 Drawing Sheets

(51) Int. Cl.
*H02J 3/18* (2006.01)
*H02J 3/01* (2006.01)
*H02J 3/50* (2006.01)

(52) U.S. Cl.
CPC .............. *H02J 3/50* (2013.01); *H02M 5/458* (2013.01); *Y02E 40/40* (2013.01); *Y02E 40/50* (2013.01)

(56) References Cited

U.S. PATENT DOCUMENTS

| | | | |
|---|---|---|---|
| 5,047,910 | A | 9/1991 | Levran et al. |
| 5,747,887 | A * | 5/1998 | Takanaga .................. H02J 3/28 |
| | | | 307/64 |
| 5,977,660 | A | 11/1999 | Mandalakas et al. |
| 7,119,452 | B2 | 10/2006 | Larsen |
| 7,166,928 | B2 | 1/2007 | Larsen |
| 7,187,566 | B2 | 3/2007 | Kawashima et al. |
| 7,212,421 | B2 | 5/2007 | Chandra et al. |
| 7,224,081 | B2 | 5/2007 | Larsen |
| 7,521,907 | B2 | 4/2009 | Cervera et al. |
| 7,923,862 | B2 | 4/2011 | Cardinal et al. |
| 8,013,580 | B2 | 9/2011 | Cervera et al. |
| 8,041,465 | B2 | 10/2011 | Larsen et al. |
| 8,659,178 | B2 | 2/2014 | Arlaban Gabeiras et al. |
| 8,669,669 | B1 | 3/2014 | Wagoner et al. |
| 8,736,241 | B2 | 5/2014 | Cervera et al. |
| 9,537,437 | B2 | 1/2017 | Wagoner et al. |
| 9,587,626 | B2 | 3/2017 | Sadaba et al. |
| 2008/0088131 | A1* | 4/2008 | Thisted .................. F03D 9/255 |
| | | | 290/44 |
| 2010/0327584 | A1* | 12/2010 | Fortmann ........... H02M 5/4585 |
| | | | 290/44 |
| 2012/0101643 | A1 | 4/2012 | Kirchner et al. |
| 2012/0205981 | A1* | 8/2012 | Varma ....................... H02J 9/00 |
| | | | 307/64 |
| 2013/0286692 | A1 | 10/2013 | Patel et al. |
| 2013/0289911 | A1 | 10/2013 | Patel et al. |
| 2014/0132229 | A1 | 5/2014 | Huang |
| 2014/0253058 | A1 | 9/2014 | Cervera et al. |
| 2014/0320056 | A1 | 10/2014 | Royak et al. |
| 2017/0025858 | A1 | 1/2017 | Garcia et al. |
| 2017/0229857 | A1* | 8/2017 | Kral ........................ H02J 3/381 |

FOREIGN PATENT DOCUMENTS

| | | |
|---|---|---|
| KR | 10-2014-0112929 A | 9/2014 |
| WO | WO2009/138808 A1 | 11/2009 |

OTHER PUBLICATIONS

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

European Search Report, dated Nov. 26, 2020, for EP Application No. 18794664.5.

* cited by examiner

ELECTRICAL POWER SYSTEMS HAVING REACTIVE POWER AND HARMONIC SUPPORT COMPONENTS

FIELD OF THE INVENTION

The present disclosure relates generally to electrical power systems for providing power to a power grid from, for example, wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

Figure 1:
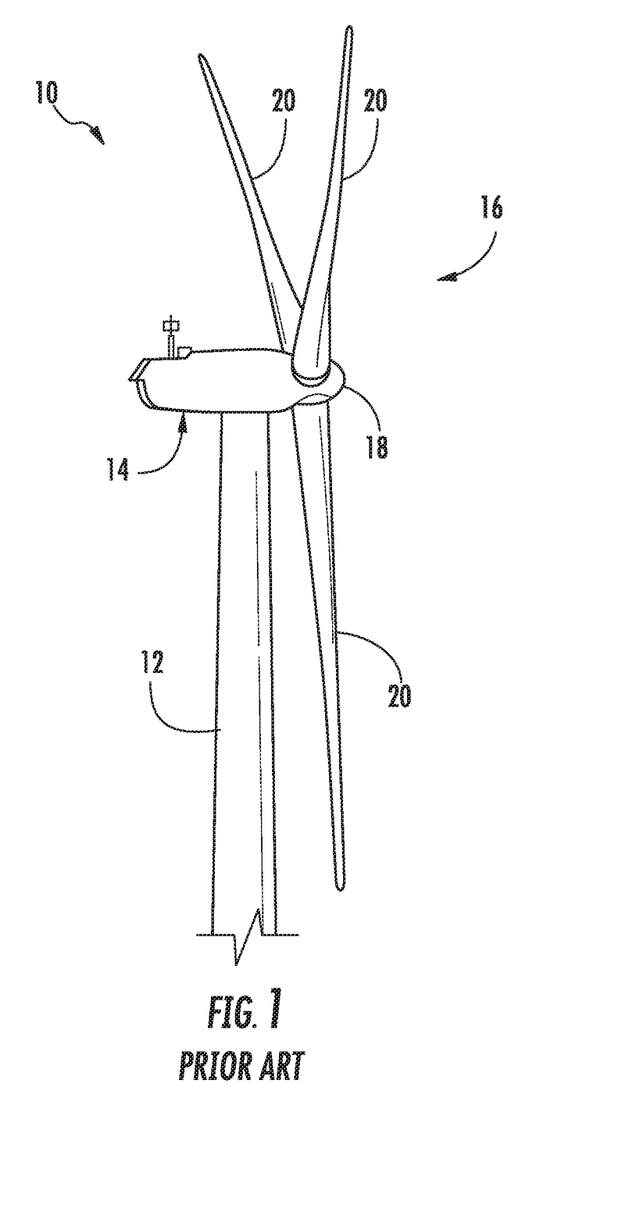
FIG. 1 illustrates a perspective view of a portion of one embodiment of a wind turbine according to conventional construction.
Figure 2:
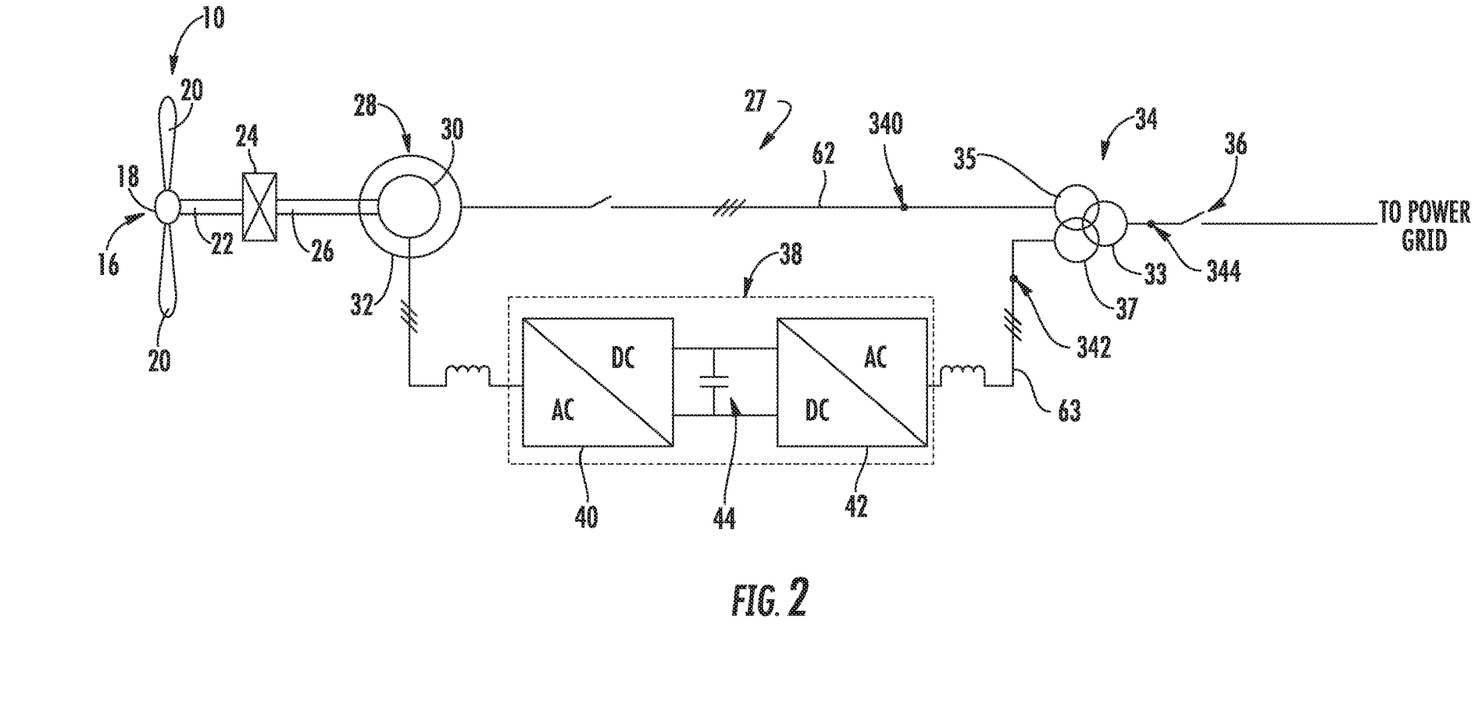
FIG. 2 illustrates a schematic diagram of one embodiment of an electrical power system for use with a wind turbine in accordance with the present disclosure.

For example, FIG. 1 illustrates a wind turbine 10. As shown, the wind turbine 10 includes a nacelle 14 that typically houses a generator. The nacelle 14 is mounted on a tower 12 extending from a support surface (not shown). The wind turbine 10 also includes a rotor 16 that includes a plurality of rotor blades 20 attached to a rotating hub 18. As wind impacts the rotor blades 20, the blades 20 transform wind energy into a mechanical rotational torque that rotatably drives a low-speed shaft 22 (FIG. 2). The low-speed shaft 22 is configured to drive a gearbox 24 (FIG. 2) (where present) that subsequently steps up the low rotational speed of the low-speed shaft 22 to drive a high-speed shaft 26 (FIG. 2) at an increased rotational speed.

The shaft 22 or 26 may be rotatably coupled to a generator of an electrical power system. In some embodiments, for example, the generator is a doubly-fed induction generator or DFIG. In other embodiments, the electrical power system is a full conversion system only coupled to the stator of the generator. In either case, the electrical power system provides the power generated by the wind turbine 10 to the power grid as electrical power in a suitable form for use in the power grid.

One issue that needs to be addressed in power systems is the generation of reactive power as requested by utility companies in addition to real power. Another issue that needs to be addressed in power systems is harmonics. Power generation systems connected to a utility grid must meet certain agency requirements for harmonics. Accordingly, power systems which include features for increasing reactive power generation while also reducing the harmonic currents being injected into the power grid, particularly in view of agency harmonics requirements, would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an electrical power system connectable to a power grid is provided. The system includes a cluster of electrical power subsystems, each of the electrical power subsystems including a power converter electrically coupled to a generator having a generator rotor and a generator stator. Each of the electrical power subsystems defines a stator power path and a converter power path for providing power to the power grid. Each of the electrical power subsystems further includes a transformer. The system further includes a subsystem breaker configured with each of the electrical power subsystems, and a cluster power path extending from each subsystem breaker for connecting the cluster of electrical power subsystems to the power grid. The system further includes a reactive power compensation inverter electrically coupled within the electrical power system, the reactive power compensation inverter operable to increase the reactive power level in the electrical current flowing to the power grid.

In accordance with another embodiment, an electrical power system connectable to a power grid is provided. The system includes an electrical power subsystem, the electrical power subsystem including a power converter electrically coupled to a generator having a generator rotor and a generator stator, the electrical power subsystem defining a generator power path from the stator and the power converter for providing power to the power grid. The electrical power subsystem further includes a transformer. The system further includes a grid power path extending from the transformer for connecting the electrical power subsystem to the power grid. The system further includes a reactive power compensation inverter electrically coupled within the electrical power system, the reactive power compensation inverter operable to increase the reactive power level in the electrical current flowing to the power grid.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 2 illustrates an electrical power subsystem 27 in accordance with embodiments of the present disclosure. In these embodiments, the high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is typically connected to a power grid via a grid breaker 36. Thus, the main transformer 34 steps up the voltage amplitude of the electrical power such that the transformed electrical power may be further transmitted to the power grid.

In addition, as shown, the generator 28 is typically electrically coupled to a bi-directional power converter 38 that includes a rotor-side converter 40 joined to a line-side converter 42 via a regulated DC link 44. The rotor-side converter 40 converts the AC power provided from the rotor 30 into DC power and provides the DC power to the DC link 44. The line side converter 42 converts the DC power on the DC link 44 into AC output power suitable for the power grid. Thus, the AC power from the power converter 38 can be combined with the power from the stator 32 via a converter power path 63 and stator power path 62 to provide multi-phase power (e.g. three-phase power) having a frequency maintained substantially at the frequency of the power grid (e.g. 50 Hz/60 Hz).

As shown in FIG. 2, the illustrated three-winding transformer 34 typically has (1) a 33 kilovolt (kV) medium voltage (MV) primary winding 33 connected to the power grid, (2) a 6 to 13.8 kV MV secondary winding 35 connected to the generator stator 32 via stator power path 62, and (3) a 690 to 900 volt (V) low-voltage (LV) tertiary winding 37 connected to the line-side power converter 42 via the converter power path 63.

Figure 3:
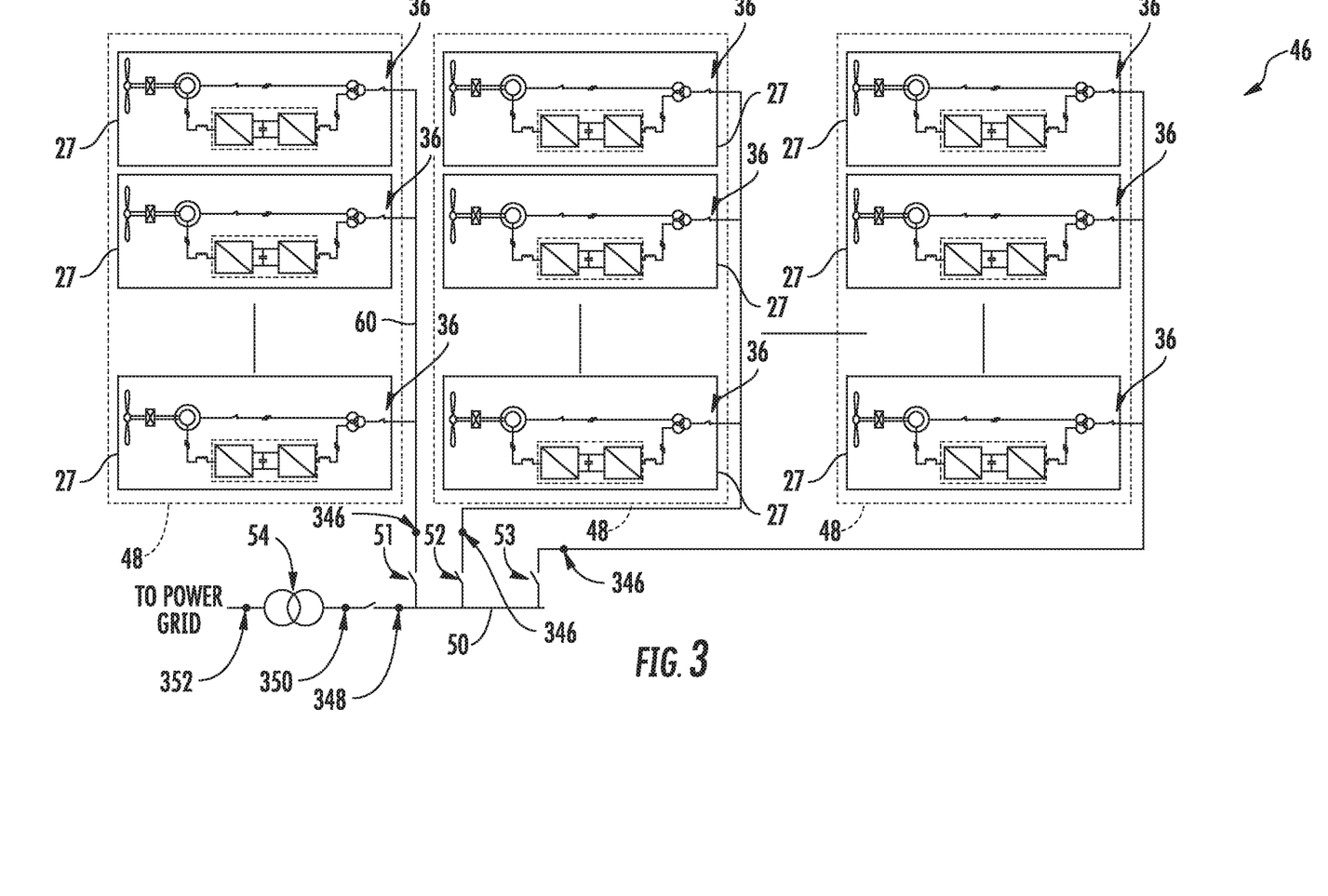
FIG. 3 illustrates a schematic diagram of one embodiment of a wind farm according to the present disclosure, particularly illustrating a plurality of wind turbine power systems such as those illustrated in FIG. 2 connected to a single sub-station transformer.

Referring now to FIG. 3, individual power subsystems 27 of a plurality of wind turbines 10 may be arranged in a predetermined geological location and electrically connected together to form an electrical power system 46. More specifically, as shown, the wind turbines 10 may be arranged into a plurality of clusters 48 with each cluster separately connected to a main line 50 via switches 51, 52, 53, respectively. In addition, as shown, the main line 50 may be electrically coupled to another, larger transformer 54 for further stepping up the voltage amplitude of the electrical power from the groups 48 of wind turbines 10 before sending the power to the grid. A cluster power path 60 may electrically connect the cluster 48 to the transformer 54. The cluster power path 60 may, for example, extend for each subsystem 27 from the subsystem breaker 36 to the transformer 54, such as via main line 50.

Figure 4:
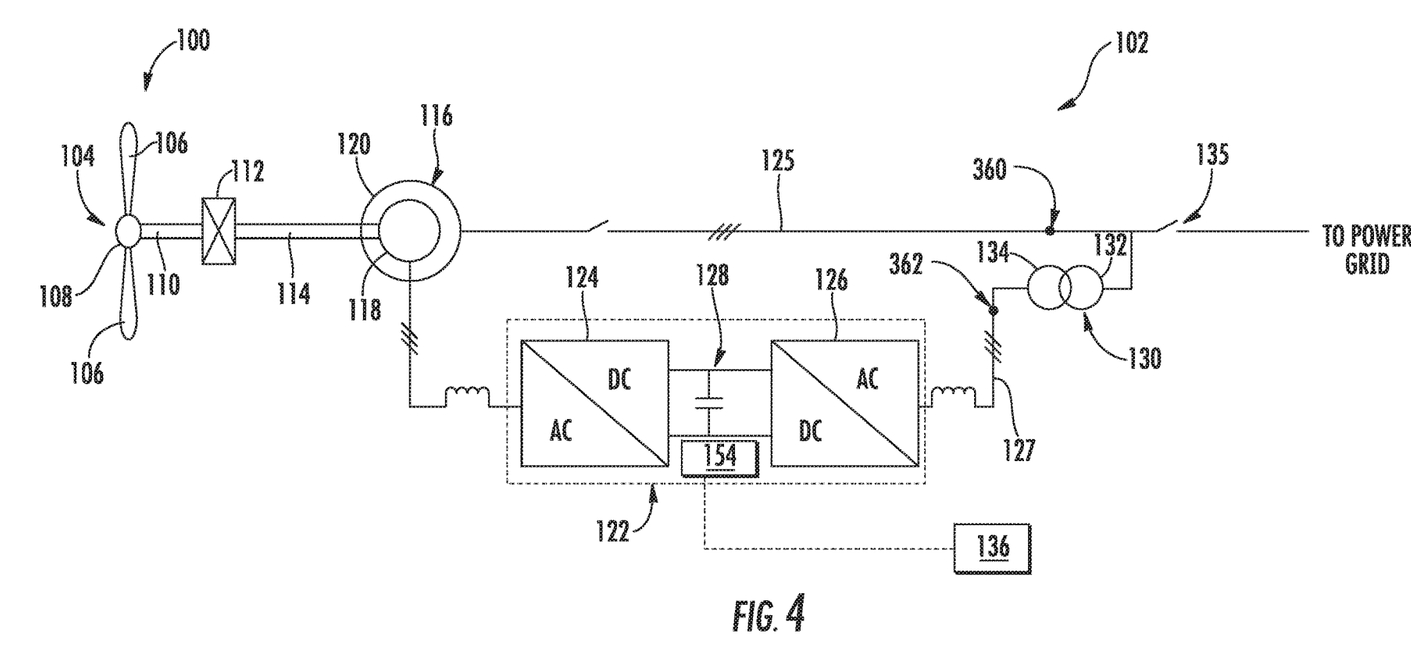
FIG. 4 illustrates a schematic diagram of another embodiment of an electrical power system for a wind turbine according to the present disclosure.

Referring now to FIG. 4, a schematic diagram of another embodiment of an electrical power subsystem 102 according to the present disclosure is illustrated. It should be understood that the term "subsystem" is used herein to distinguish between the individual power systems (e.g. as shown in FIG. 4 or FIG. 2) and the overall electrical power system 105 of FIG. 5 or 46 of FIG. 3 that includes a plurality of electrical power subsystems 102 or 27. Those of ordinary skill in the art, however, will recognize that the electrical power subsystem 102 of FIG. 4 (or 27 of FIG. 2) may also be referred to more generically, such as a simply a system (rather than a subsystem). Therefore, such terms may be used interchangeably and are not meant to be limiting.

Further, as shown in FIG. 4, the electrical power subsystem 102 may correspond to a wind turbine power system 100. More specifically, as shown, the wind turbine power system 100 includes a rotor 104 that includes a plurality of rotor blades 106 attached to a rotating hub 108. As wind impacts the rotor blades 106, the blades 106 transform wind energy into a mechanical rotational torque that rotatably drives a low-speed shaft 110. The low-speed shaft 110 is configured to drive a gearbox 112 that subsequently steps up the low rotational speed of the low-speed shaft 110 to drive a high-speed shaft 114 at an increased rotational speed. The high-speed shaft 114 is generally rotatably coupled to a doubly-fed induction generator 116 (referred to hereinafter as DFIG 116) so as to rotatably drive a generator rotor 118. As such, a rotating magnetic field may be induced by the generator rotor 118 and a voltage may be induced within a generator stator 120 that is magnetically coupled to the generator rotor 118. In one embodiment, for example, the generator 116 is configured to convert the rotational mechanical energy to a sinusoidal, three-phase alternating current (AC) electrical energy signal in the generator stator 120. Thus, as shown, the associated electrical power can be transmitted from the generator stator 120 directly the grid.

In addition, as shown in FIG. 4, the generator 116 is electrically coupled to a bi-directional power converter 122 that includes a rotor-side converter 124 joined to a line-side converter 126 via a regulated DC link 128. Thus, the rotor-side converter 124 converts the AC power provided from the generator rotor 118 into DC power and provides the DC power to the DC link 128. The line side converter 126 converts the DC power on the DC link 128 into AC output power suitable for the power grid. More specifically, as shown, the AC power from the power converter 122 can be combined with the power from the generator stator 120 via a converter power path 127 and a stator power path 125, respectively. For example, as shown, and in contrast to the systems illustrated in FIGS. 2-3, the converter power path 127 may include a partial power transformer 130 for stepping up the voltage amplitude of the electrical power from the power converter 122 such that the transformed electrical power may be further transmitted to the power grid. Thus, as shown, the illustrated system 102 of FIG. 4 does not include the three-winding main transformer described above. Rather, as shown in the illustrated embodiment, the partial power transformer 130 may correspond to a two-winding transformer having a primary winding 132 connected to the power grid and a secondary winding 134 connected to the line side converter 126. Notably, the partial power transformer may in some embodiments include a third auxiliary winding for auxiliary loads.

In addition, the electrical power subsystem 102 may include a turbine controller 136 configured to control any of the components of the wind turbine 100 and/or implement the method steps as described herein. For example, as shown particularly in FIG. 6, the turbine controller 136 may include one or more processor(s) 138 and associated memory device(s) 140 configured to perform a variety of computer-implemented functions (e.g., performing the methods, steps, calculations and the like and storing relevant data as disclosed herein). Additionally, the turbine controller 136 may also include a communications module 142 to facilitate communications between the turbine controller 136 and the various components of the wind turbine 100, e.g. any of the components of FIGS. 4 and 5. Further, the communications module 142 may include a sensor interface 144 (e.g., one or more analog-to-digital converters) to permit signals transmitted from one or more sensors 139, 141, 143 to be converted into signals that can be understood and processed by the processors 138. It should be appreciated that the sensors 139, 141, 143 may be communicatively coupled to the communications module 142 using any suitable means. For example, as shown in FIG. 6, the sensors 139, 141, 143 may be coupled to the sensor interface 144 via a wired connection. However, in other embodiments, the sensors 139, 141, 143 may be coupled to the sensor interface 144 via a wireless connection, such as by using any suitable wireless communications protocol known in the art. As such, the processor 138 may be configured to receive one or more signals from the sensors 139, 141, 143.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 138 is also configured to compute advanced control algorithms and communicate to a variety of Ethernet or serial-based protocols (Modbus, OPC, CAN, etc.). Additionally, the memory device(s) 140 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 138, configure the turbine controller 136 to perform the various functions as described herein.

In operation, alternating current (AC) power generated at the generator stator 120 by rotation of the rotor 104 is provided via a dual path to the grid, i.e. via the stator power path 125 and the converter power path 127. More specifically, the rotor side converter 124 converts the AC power provided from the generator rotor 118 into DC power and provides the DC power to the DC link 128. Switching elements (e.g. IGBTs) used in bridge circuits of the rotor side converter 124 can be modulated to convert the AC power provided from the generator rotor 118 into DC power suitable for the DC link 128. The line side converter 126 converts the DC power on the DC link 128 into AC output power suitable for the grid. In particular, switching elements (e.g. IGBTs) used in bridge circuits of the line side converter 126 can be modulated to convert the DC power on the DC link 128 into AC power. As such, the AC power from the power converter 122 can be combined with the power from the generator stator 120 to provide multi-phase power having a frequency maintained substantially at the frequency of the grid. It should be understood that the rotor side converter 124 and the line side converter 126 may have any configuration using any switching devices that facilitate operation of an electrical power system as described herein.

Further, the power converter 122 may be coupled in electronic data communication with the turbine controller 136 and/or a separate or integral converter controller 154 to control the operation of the rotor side converter 124 and the line side converter 126. For example, during operation, the turbine controller 136 may be configured to receive one or more voltage and/or electric current measurement signals from the first set of voltage and electric current sensors 139, 141, 143. Thus, the turbine controller 136 may be configured to monitor and control at least some of the operational variables associated with the wind turbine 100 via the sensors 139, 141, 143. In the illustrated embodiment, the electric current sensors 139, 141, 143 may be electrically coupled to any portion of electrical power subsystem 102 that facilitates operation of electrical power subsystem 102 as described herein.

It should also be understood that any number or type of voltage and/or electric current sensors may be employed within the wind turbine 100 and at any location. For example, the sensors may be current transformers, shunt sensors, rogowski coils, Hall Effect current sensors, Micro Inertial Measurement Units (MIMUs), or similar, and/or any other suitable voltage or electric current sensors now known or later developed in the art. Thus, the converter controller 154 is configured to receive one or more voltage and/or electric current feedback signals from the electric current sensors 139, 141, 143. More specifically, in certain embodiments, the current or voltage feedback signals may include at least one of line feedback signals, line-side converter feedback signals, rotor-side converter feedback signals, or stator feedback signals.

Figure 5:
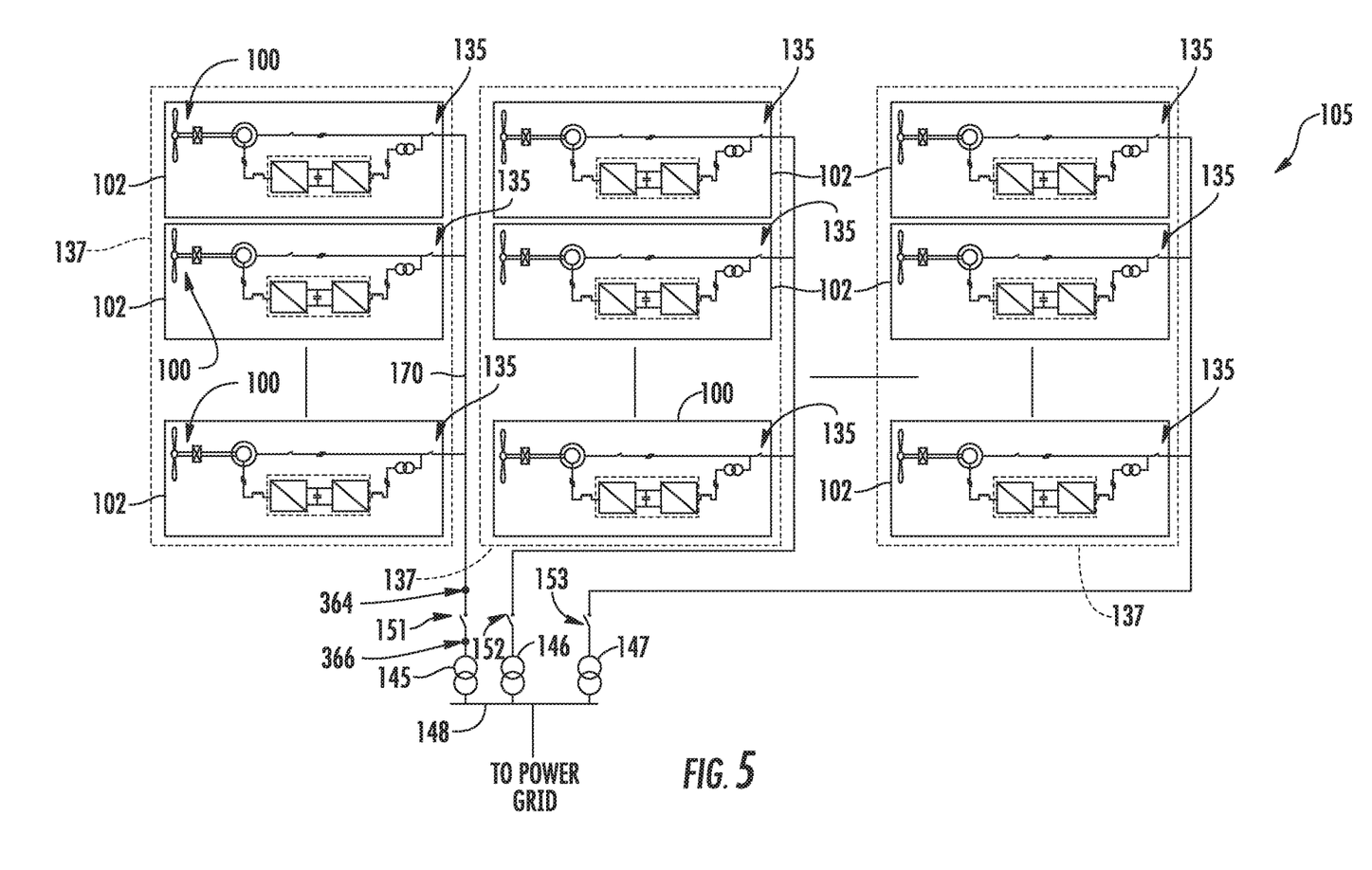
FIG. 5 illustrates a schematic diagram of another embodiment of a wind farm according to the present disclosure, particularly illustrating a plurality of wind turbine clusters each connected to the grid via a cluster transformer.
Figure 6:
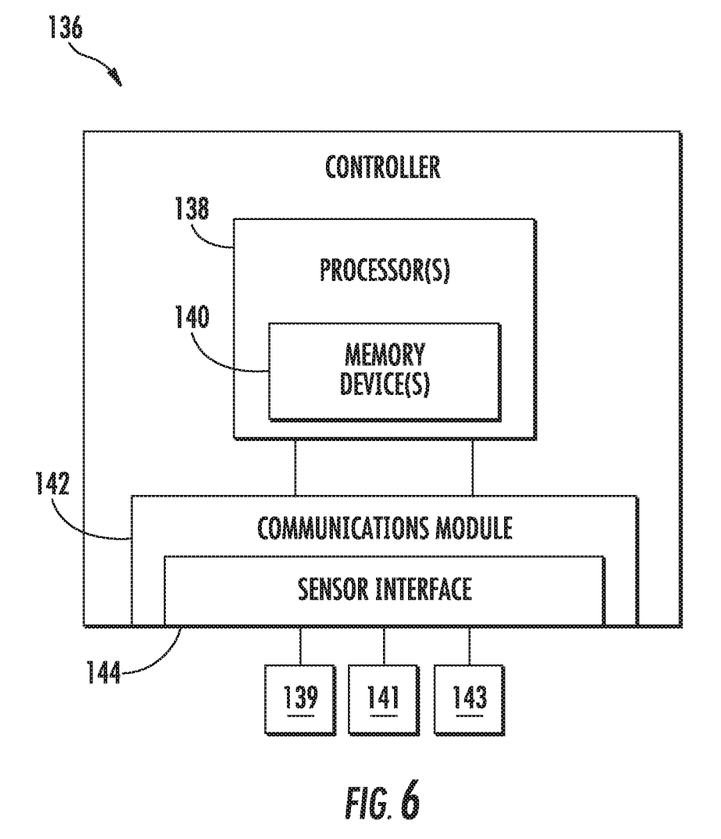
FIG. 6 illustrates a block diagram of one embodiment of a wind turbine controller according to the present disclosure.

Referring particularly to FIG. 5, individual power systems (such as the power subsystem 102 illustrated in FIG. 4) may be arranged in at least two clusters 137 to form an electrical power system 105. More specifically, as shown, the wind turbine power systems 100 may be arranged into a plurality of clusters 137 so as to form a wind farm. Thus, as shown, each cluster 137 may be connected to a separate cluster transformer 145, 146, 147 via switches 151, 152, 153, respectively, for stepping up the voltage amplitude of the electrical power from each cluster 137 such that the transformed electrical power may be further transmitted to the power grid. In addition, as shown, the transformers 145, 146, 147 are connected to a main line 148 that combines the power from each cluster 137 before sending the power to the grid. In other words, the stator power circuit of all the wind turbines 100 share a common ground reference provided by the neutral of the secondary winding of the cluster transformers 145, 146, 147 or alternately by a separate neutral grounding transformer. Each subsystem 102 may be connected to the cluster 137 via a subsystem breaker 135, as shown. A cluster power path 170 may electrically connect the cluster 137 to the cluster transformer 145, 146, 147. The cluster power path 170 may, for example, extend for each subsystem 102 from the subsystem breaker 135 to the cluster transformer 145, 146, 147, such as to the winding of the cluster transformer to which the subsystem 102 is connected.

Figure 7:
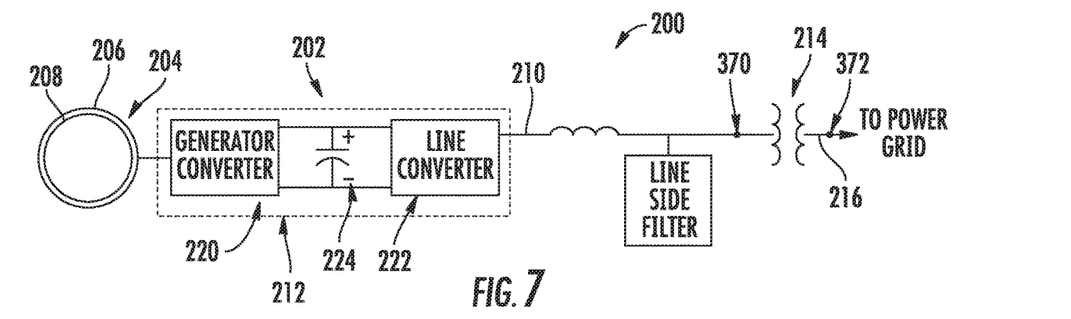
FIG. 7 illustrates a schematic diagram of another embodiment of an electrical power system for a wind turbine according to the present disclosure.

Referring now to FIG. 7, another embodiment of an electrical power system 200 which includes a single subsystem 202 is illustrated. In this embodiment, the subsystem 202 is a full conversion subsystem rather than a DFIG subsystem, with only a single generator power path 210 from the stator 206 of a generator 204 (which also includes a rotor 208) through a power converter 212 to a transformer 214. The transformer 214 in these embodiments is a two-winding transformer which electrically couples the generator power path 210 to a grid power path 216. The grid power path 216 provides a path for the flow of electrical power to the power grid.

The power converter 212 may include a generator side converter 220, a line side converter 222, and a DC link 224. Switching elements (e.g. IGBTs) used in bridge circuits of the generator side converter 220 can be modulated to convert the AC power provided from the generator stator 206 into DC power suitable for the DC link 224. The line side converter 222 converts the DC power on the DC link 224 into AC output power suitable for the grid. In particular, switching elements (e.g. IGBTs) used in bridge circuits of the line side converter 222 can be modulated to convert the DC power on the DC link 224 into AC power. It should be understood that the generator side converter 220 and the line side converter 222 may have any configuration using any switching devices that facilitate operation of electrical power system 200 as described herein.

It should be understood that the turbine controller 136 and controller 154 as described herein may be utilized with any suitable electrical power systems, subsystems, and power converters thereof as discussed herein, such as any embodiments as discussed in FIGS. 2-7.

Referring now to FIGS. 2-11, an electrical power system 46, 105, 200 may include one or more electrical power subsystems 27, 102, 202 as discussed herein. Further, an electrical power system may include a reactive power compensation inverter 300 electrically coupled within the electrical power system 46, 105, 200. The reactive power compensation inverter 300 may be operable to increase the reactive power level in the electrical current flowing to the power grid, as discussed herein. Still further, in some embodiments an electrical power system may include an active harmonic filter 320 electrically coupled within the electrical power system 46, 105, 200. The active harmonic filter 320 may be operable to reduce harmonics in the electrical current flowing to the power grid, as discussed herein. Advantageously, the use of a reactive power compensation inverter 300 and/or active harmonic filter 320 as discussed herein may efficiently and cost-effectively increase the reactive power level and/or reduce the harmonic current distortion in the electrical current being generated by the electrical power system 46, 105, 200.

The reactive power compensation inverter 300 advantageously provides current at the power grid fundamental frequency (i.e. 50 Hz or 60 Hz) to control the level of reactive power, such as in some embodiments all reactive power and no real power. Because the reactive power compensation inverter 300 operates at a relatively low frequency output current, the reactive power compensation inverter 300 can utilize a relatively slow and cost-effective switching frequency, such as in the range of 1 KHz to 5 KHz. As discussed herein, relatively inexpensive IGBTs can thus be utilized in the reactive power compensation inverter 300.

The active harmonic filter 320 advantageously reduces or eliminates harmonic currents at frequencies higher than the power grid fundamental frequency, such as harmonic frequencies from the 2nd harmonic to the 50th harmonic. Because the active harmonic filter 320 operates at a relatively high frequency output current, the active harmonic filter 320 must utilize a relatively high switching frequency, such as in the range of 20 KHz to 50 KHz. As discussed herein MOSFETs can thus be utilized as necessary to produce a relatively lower level of power (relative to that produced by the reactive power compensation inverter 300).

Figure 8:
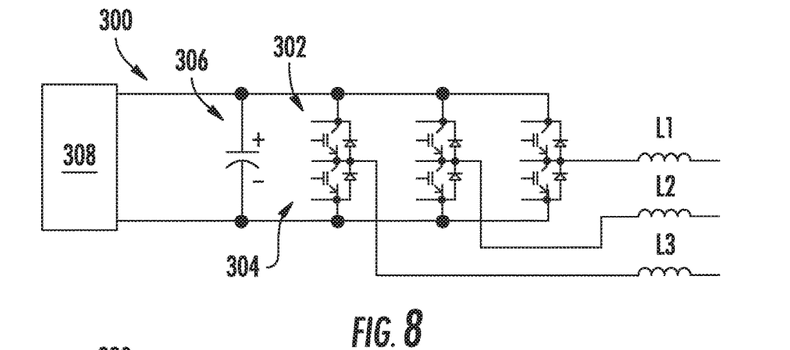
FIG. 8 illustrates a schematic diagram of one embodiment of a reactive power compensation inverter for use in an electrical power system according to the present disclosure.

FIG. 8 illustrates one embodiment of a reactive power compensation inverter 300. In this embodiment, each phase of the inverter 300 includes a first switching element 302 and a second switching element 304 in series with each other. Inverter 300 may additionally include a capacitor 306, as shown. Switching elements 302 and 304 may be any suitable switching devices. However, in exemplary embodiments, the first switching element 302 and second switching element 304 are insulated-gate bipolar transistors ("IGBTs"). Each IGBT may have a gate, a collector, and an emitter, as shown. It should be noted that the present disclosure is not limited to the above-described inverter 300 embodiment. Rather, other suitable embodiments, such as having other topology configurations including for example three or more levels and/or greater than or less than three phases, may be utilized.

Figure 9:
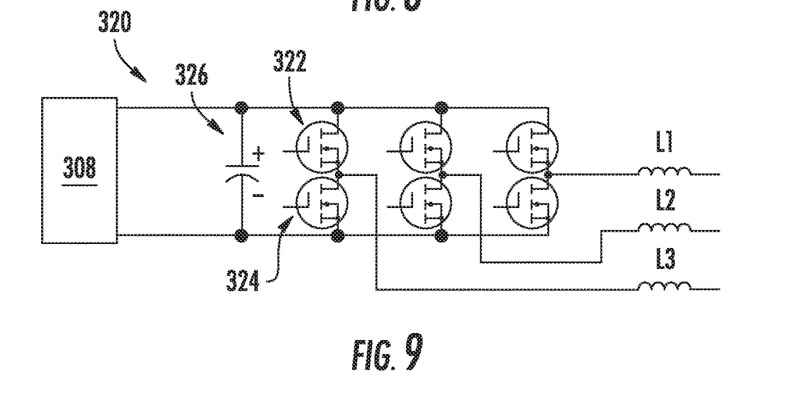
FIG. 9 illustrates a schematic diagram of one embodiment of an active harmonic filter for use in an electrical power system according to the present disclosure.

FIG. 9 illustrates one embodiment of an active harmonic filter 320. In this embodiment, each phase of the filter 320 includes a third switching element 322 and a fourth switching element 324 in series with each other. Filter 320 may additionally include a capacitor 326, as shown. Switching elements 322 and 324 may be any suitable switching devices. However, in exemplary embodiments, the third switching element 322 and fourth switching element 324 are metal-oxide-semiconductor field-effect transistors ("MOSFETs"). Further, in particularly advantageous embodiments, the MOSFETs are silicon carbide MOSFETs. In alternative embodiments, the third switching element 322 and fourth switching element 324 are IGBTs. It should be noted that the present disclosure is not limited to the above-described filter 320 embodiment. Rather, other suitable embodiments, such as having other topology configurations including for example three or more levels and/or greater than or less than three phases, may be utilized.

As further illustrated in FIGS. 8 and 9, in some embodiments an auxiliary energy source 308 and/or 328 may be included. For example, FIG. 8 illustrates an auxiliary energy source 308 electrically connected to the inverter 300, and FIG. 9 illustrates an auxiliary energy source 328 electrically connected to the filter 320. In embodiments wherein the inverter 300 and filter 320 are at the same location, a single auxiliary energy source may be electrically connected to both the inverter 300 and the filter 320. The auxiliary energy source 308, 328 may, for example, be a solar array or battery, and in some embodiments may include a separate DC/DC converter. Such auxiliary energy source may advantageously facilitate an additional power flow to the inverter 300 and/or filter 320 in addition to the control of reactive power and the reduction in harmonics.

Figure 10:
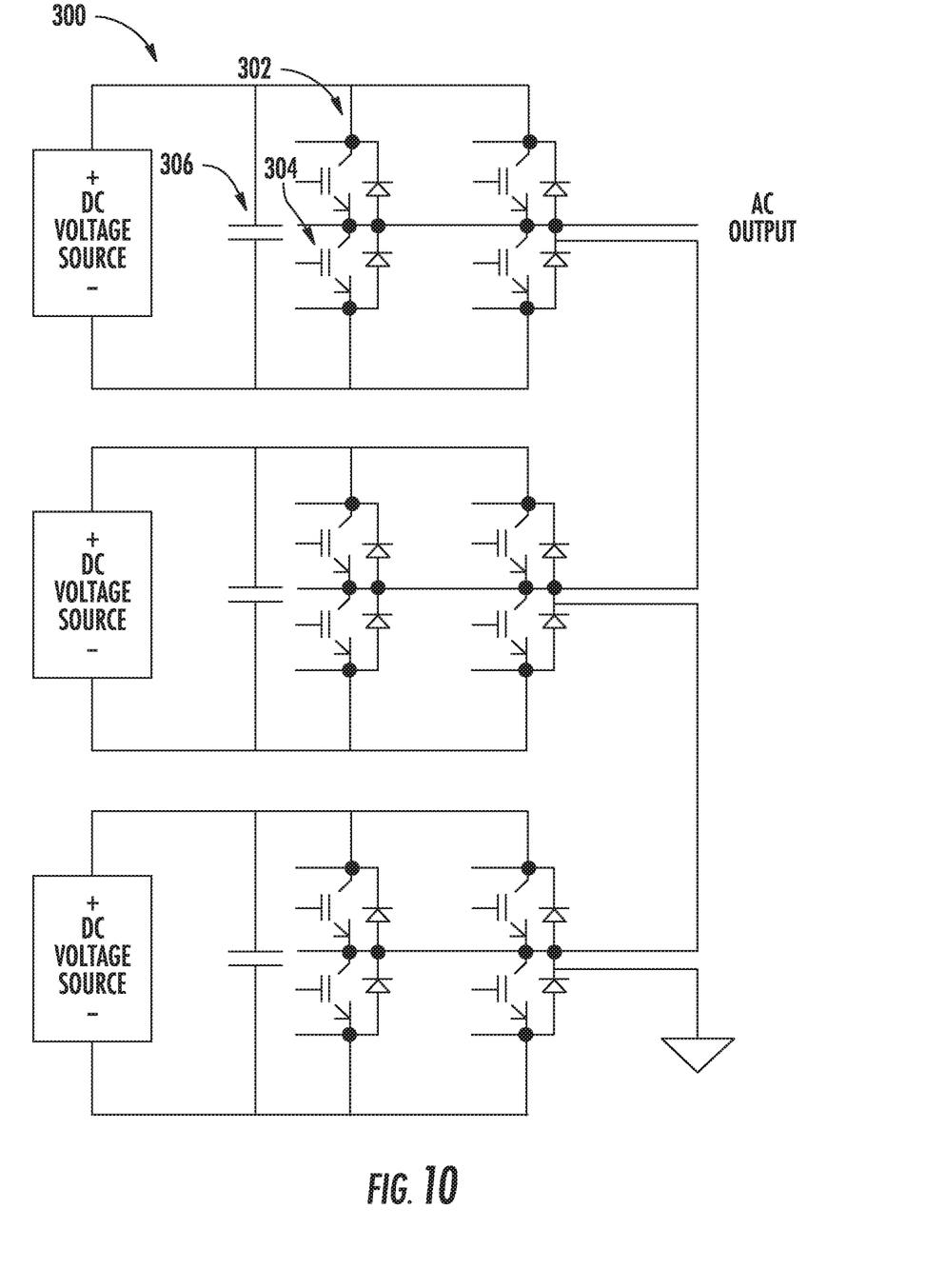
FIG. 10 illustrates a schematic diagram of another embodiment of a reactive power compensation inverter for use in an electrical power system according to the present disclosure.
Figure 11:
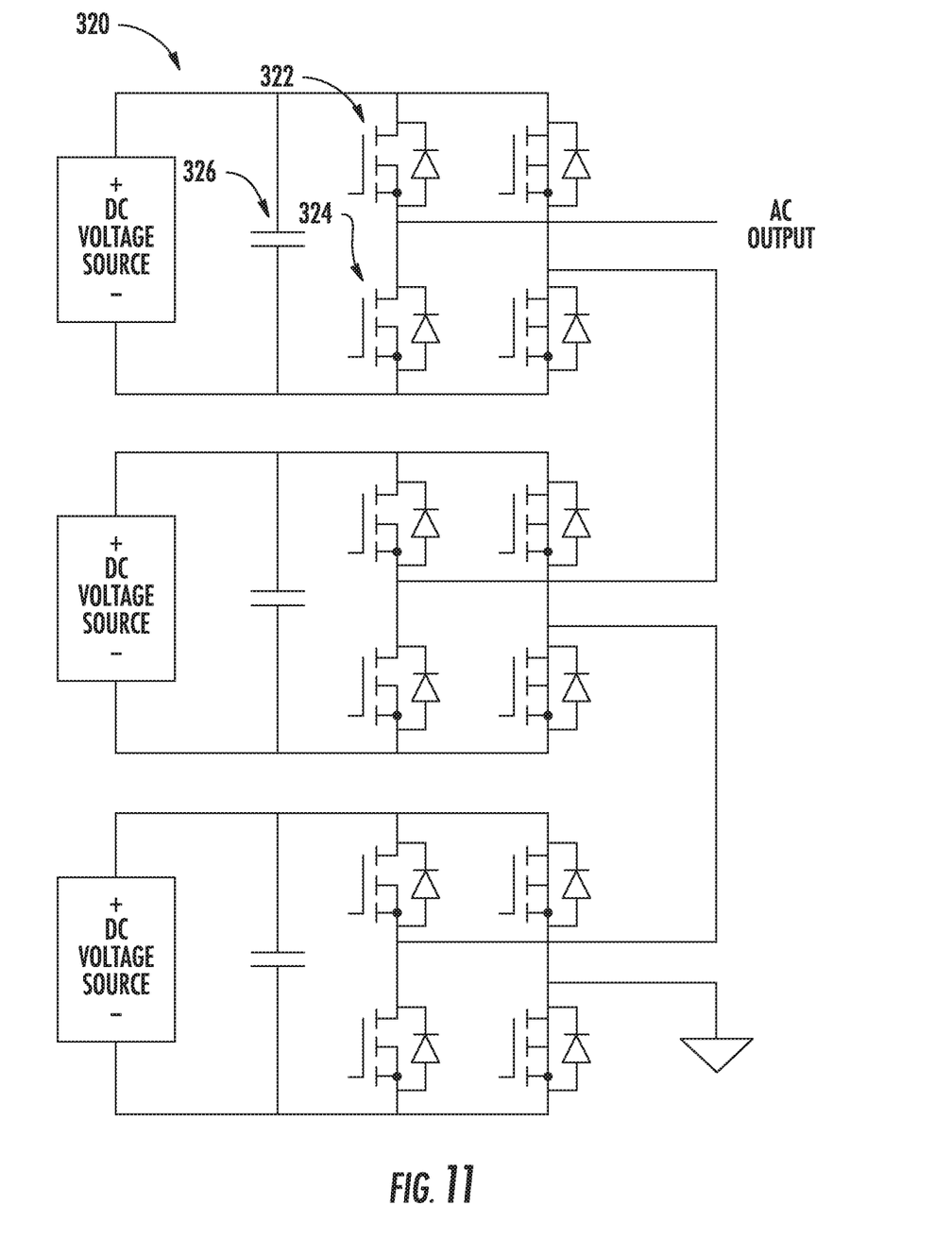
FIG. 11 illustrates a schematic diagram of another embodiment of an active harmonic filter for use in an electrical power system according to the present disclosure.

In some embodiments, as illustrated in FIGS. 10 and 11, the inverter 300 or filter 320 may be configured as one or more H-bridges. FIGS. 10 and 11 each illustrate an embodiment wherein each phase of the inverter 300 (FIG. 10) or filter 320 (FIG. 11) utilizes multiple H-bridges connected in series. Alternatively, however, only a single H-bridge may be utilized for each phase.

Referring again to FIGS. 2-5 and 7, the reactive power compensation inverter 300 and active harmonic filter 320 may be electrically coupled within the electrical power system 46, 105, 200 at various suitable locations. More specifically, the reactive power compensation inverter 300 and active harmonic filter 320 may be coupled at particular locations along one or more power paths within an electrical power system 46, 105, 200. In some embodiments, the reactive power compensation inverter 300 and active harmonic filter 320 are electrically coupled at the same location within the electrical power system 46, 105, 200. In these embodiments, the same bus or wiring may connect the reactive power compensation inverter 300 and active harmonic filter 320 to a power path of the electrical power system 46, 105, 200. Further, in particularly advantageous embodiments, the reactive power compensation inverter 300 and active harmonic filter 320 may be packaged together as a single unit using, for example, a common cooling system and common controls. Alternatively, however, the reactive power compensation inverter 300 and active harmonic filter 320 may be electrically coupled at different locations within the electrical power system 46, 105, 200.

Various locations are identified in FIGS. 2 through 5 and 7 at which one or both of the reactive power compensation inverter 300 or active harmonic filter 320 may be electrically coupled to the electrical power system 46, 105, 200. Referring to FIG. 2, in some embodiments, one or both of the reactive power compensation inverter 300 or active harmonic filter 320 may be electrically coupled to the stator power path 62, such as at a location 340 between the stator 32 and winding 35 as illustrated. Additionally or alternatively, one or both of the reactive power compensation inverter 300 or active harmonic filter 320 may be electrically coupled to the converter power path 63, such as at a location 342 between the power converter 38 and winding 37 as illustrated. Additionally or alternatively, one or both of the reactive power compensation inverter 300 or active harmonic filter 320 may be electrically coupled to the power path between winding 33 and breaker 36, such as at a location 344 as illustrated.

Referring to FIG. 3, in some embodiments, one or both of the reactive power compensation inverter 300 or active harmonic filter 320 may be electrically coupled to the cluster power path 60, such as at a location 346 between the breaker 36 and switch 51, 52, 53 as illustrated. Additionally or alternatively, one or both of the reactive power compensation inverter 300 or active harmonic filter 320 may be electrically coupled to the main line between switch 51, 52, 53 and transformer 54, such as at a location 348 (before a breaker for transformer 54) or location 350 (after the breaker for transformer 54) as illustrated. Additionally or alternatively, one or both of the reactive power compensation inverter 300 or active harmonic filter 320 may be electrically coupled to the line leading from the transformer 54 to the power grid, such as at a location 352 as illustrated.

Referring to FIG. 4, in some embodiments, one or both of the reactive power compensation inverter 300 or active harmonic filter 320 may be electrically coupled to the stator power path 125, such as at a location 360 between the stator 116 and breaker 135 as illustrated. Additionally or alternatively, one or both of the reactive power compensation inverter 300 or active harmonic filter 320 may be electrically coupled to the converter power path 127, such as at a location 362 between the power converter 122 and winding 134 as illustrated.

Referring to FIG. 5, in some embodiments, one or both of the reactive power compensation inverter 300 or active harmonic filter 320 may be electrically coupled to the cluster power path 170, such as at a location 364 between the breaker 135 and switch 151, 152, 153 as illustrated. Additionally or alternatively, one or both of the reactive power compensation inverter 300 or active harmonic filter 320 may be electrically coupled to the main line between switch 151, 152, 153 and cluster transformer 145, 146, 147, such as at a location 366 as illustrated.

Referring to FIG. 7, in some embodiments, one or both of the reactive power compensation inverter 300 or active harmonic filter 320 may be electrically coupled to the generator power path 210, such as at location 370 as illustrated. Additionally or alternatively, one or both of the reactive power compensation inverter 300 or active harmonic filter 320 may be electrically coupled to the grid power path 216, such as at location 372 as illustrated.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical power system connectable to a power grid, comprising:
    a cluster of electrical power subsystems, each of the electrical power subsystems comprising a power converter electrically coupled to a generator having a generator rotor and a generator stator, each of the electrical power subsystems defining a stator power path and a converter power path for providing power to the power grid, each of the electrical power subsystems further comprising a transformer;
    a subsystem breaker configured with each of the electrical power subsystems;
    a cluster power path extending from each subsystem breaker for connecting the cluster of electrical power subsystems to the power grid; and
    a reactive power compensation inverter electrically coupled within one of the electrical power subsystems between the corresponding generator and the corresponding transformer, the reactive power compensation inverter including a power source, first and second switching elements in series with each other, and a capacitor positioned between the power source and the first and second switching elements such that the reactive power compensation inverter increases the reactive power level in the electrical current flowing through at least one of the corresponding stator power path or the corresponding converter power path.

2. The electrical power system of claim 1, wherein the first and second switching elements are insulated-gate bipolar transistors.

3. The electrical power system of claim 1, further comprising an active harmonic filter electrically coupled within the electrical power system, the active harmonic filter operable to reduce harmonics in the electrical current flowing to the power grid.

4. The electrical power system of claim 3, wherein the active harmonic filter comprises a third switching element and a fourth switching element in series with each other.

5. The electrical power system of claim 4, wherein the third switching element and fourth switching element are metal-oxide-semiconductor field-effect transistors.

6. The electrical power system of claim 5, wherein the metal-oxide-semiconductor field-effect transistors are silicon carbide metal-oxide-semiconductor field-effect transistors.

7. The electrical power system of claim 3, wherein the reactive power compensation inverter and the active harmonic filter are electrically coupled at the same location within the electrical power system.

8. The electrical power system of claim 3, wherein the reactive power compensation inverter and the active harmonic filter are electrically coupled at different locations within the electrical power system.

9. The electrical power system of claim 3, wherein at least one of the reactive power compensation inverter or the active harmonic filter is configured as an H-bridge.

10. The electrical power system of claim 1, further comprising a cluster transformer for connecting each cluster of electrical power subsystems to the power grid and a cluster switch configured with the cluster transformer.

11. The electrical power system of claim 1, wherein the transformer of each electrical power subsystem is a three-winding transformer between the stator power path, the converter power path, and the cluster power path.

12. An electrical power system connectable to a power grid, comprising:
an electrical power subsystem, the electrical power subsystem comprising a power converter electrically coupled to a generator having a generator rotor and a generator stator, the electrical power subsystem defining a generator power path from the stator and the power converter for providing power to the power grid, the electrical power subsystem further comprising a transformer;
a grid power path extending from the transformer for connecting the electrical power subsystem to the power grid; and
a reactive power compensation inverter electrically coupled within one of the electrical power subsystems between the corresponding generator and the corresponding transformer, the reactive power compensation inverter including a power source, first and second switching elements in series with each other, and a capacitor positioned between the power source and the first and second switching elements such that the reactive power compensation inverter increases the reactive power level in the electrical current flowing through at least one of the corresponding stator power path or the corresponding converter power path.

13. The electrical power system of claim 12, wherein the first and second switching elements are insulated-gate bipolar transistors.

14. The electrical power system of claim 12, further comprising an active harmonic filter electrically coupled within the electrical power system, the active harmonic filter operable to reduce harmonics in the electrical current flowing to the power grid.

15. The electrical power system of claim 14, wherein the active harmonic filter comprises a third switching element and a fourth switching element in series with each other.

16. The electrical power system of claim 15, wherein the third switching element and fourth switching element are metal-oxide-semiconductor field-effect transistors.

17. The electrical power system of claim 14, wherein the reactive power compensation inverter and the active harmonic filter are electrically coupled at the same location within the electrical power system.

18. The electrical power system of claim 14, wherein the reactive power compensation inverter and the active harmonic filter are electrically coupled at different locations within the electrical power system.

* * * * *